Sept. 15, 1936.  E. H. C. GRAPENGETER  2,054,500
PROCESS FOR TREATMENT OF FOODSTUFFS
Filed Oct. 28, 1932
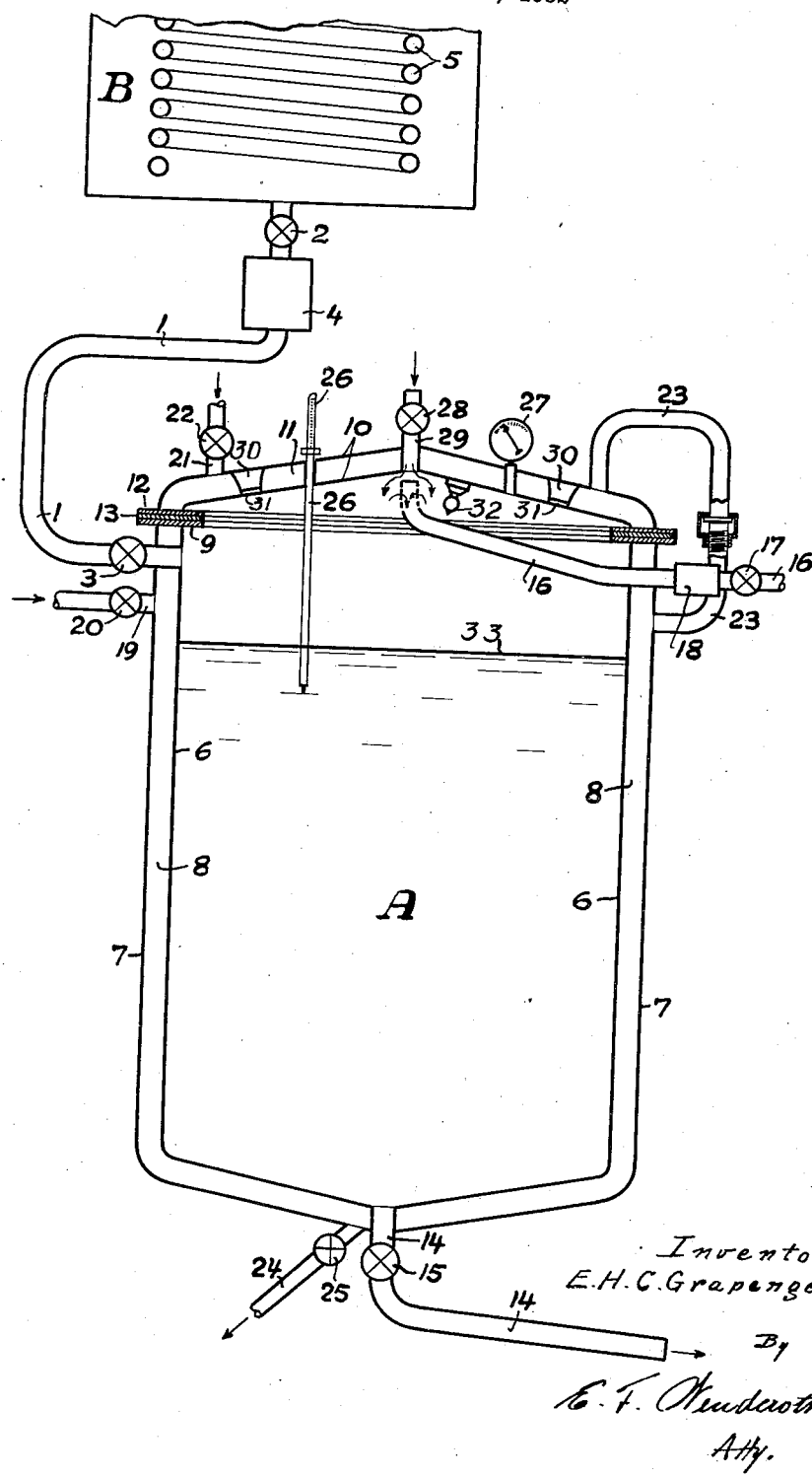
Inventor:
E. H. C. Grapengeter,
By Patented Sept. 15, 1936

2,054,500

UNITED STATES PATENT OFFICE 2,054,500

PROCESS FOR TREATMENT OF FOODSTUFFS

Ernst Heinrich Christian Grapengeter,
Hamburg, Germany

Application October 28, 1932, Serial No. 640,096
In Germany October 1, 1932

9 Claims. (Cl. 99—211)

In the sterilization or other heat treatment of milk and similar liquids, such for example as edible products dissolved or emulsified in a suitable liquid vehicle, it is old to heat the material concerned to a temperature of about 60 to 65° C. and then to place the same under vacuum for low-pressure boiling at the temperature indicated for about 15 to 20 minutes, after which the vacuum is relieved, and the material is allowed to cool down to ordinary temperature.

The present invention relates to a process having certain features in common with this known process, but deviating mainly therefrom by the feature that the vacuum over the material, towards the end of the period of low-pressure boiling which may be reduced to about 10 minutes, is suddenly increased, for instance from 23⅝ to 27½ or 29⅛ inches of mercury, the result being that the period is finished with a vigorous ebullition. It will further be preferable to take care that the low-pressure boiling preceding this vigorous ebullition should be effected not at constant but at decreasing temperature, and with decreasing intensity, the result being that the vigorous ebullition will be relatively more intense and, therefore, will have a more powerful effect.

According to my new process, not only may milk and similar liquids, such for example as edible products dissolved or emulsified in a suitable liquid vehicle, be treated, for instance poorer wines, spirits and fruit wines, but also solid articles of food or enjoyment enclosed in liquid, such as fruits in a solution of sugar.

The increase in the vacuum for the purpose of producing the sudden ebullition is preferably effected by an intense cooling of the low-pressure air standing over the material, whereby also the material itself may be cooled to some extent. This cooling itself may be effected by any solid liquid or gaseous cooling medium. The low pressure boiling preceding the above mentioned sudden ebullition is caused to be performed at decreasing temperature and with decreasing intensity, when the heating of the material is discontinued, as soon as the latter has reached the desired temperature selected between 50 and 65° C. all according to the object of the treatment, and suitably the vacuum pump is also stopped, as soon as the material thus heated has commenced to boil. The boiling will then in fact produce a cooling of the material, and the boiling will then only continue at the same rate as the vacuum rises in consequence of the natural cooling taking place.

The sudden and considerable increase in the vacuum, for instance as mentioned above from 23⅝ to 27½ or 29⅛ inches, has for its consequence not only a vivid ebullition of the material, but also that micro-organisms and other cells in the material will expand greatly and rise to the surface, where they will finally burst and thus be killed. As far as milk is concerned, the initial heating will have caused a lively growth of the bacteria present, but the latter have thereby at the same time become less resistive, so that they will be killed instantaneously by the sudden drop in pressure. The milk undergoes thus a very efficient sterilization, and will therefore be more durable and, at the same time, more pure in respect to taste and smell. Beet taste and stable smell in milk can thus be eliminated entirely by treating the milk in accordance with the present invention. A further circumstance of the greatest importance is that while formerly a greater durability of food stuffs could only be attained at the cost of the contents of valuable substances, such as vitamines, enzymes, albumins and the like, the process described will cause such valuable substances to be preserved in their natural state and quantity in the food stuff.

Other substances than milk are subject to similar conditions. From wine and the like, impurities will be extracted, and a purer and more healthful article with a purer and better taste and smell will result. Fruit treated according to the process retains its fresh natural taste and will keep for years, if stored in hermetically closed receptacles.

The invention relates further to an apparatus for performing in practice the process here described. One construction of such an apparatus is illustrated on the drawing, which shows a vertical section of the apparatus, and will be described in the following under the assumption that milk is the substance to be treated.

The apparatus consists of a main tank A and a storage tank B, interconnected by a pipe line 1 with stop cocks 2 and 3 and a sieve 4, by way of which the milk can be directed from the storage tank to the main tank, and may be sucked into the latter, if a vacuum be maintained there. In the storage tank a steam coil 5 may be provided for the purpose of preheating the milk.

The main tank A is double-walled consisting of an inner pot-shaped vessel 6 and an outer, similarly pot-shaped vessel 7 with an intermediate hollow space 8, which is closed at the top by a flange 9, and the top of the tank is formed by a similarly double-walled lid 10 (with cavity 11), which by means of a flange 12 and an annular packing 13 can fit air-tightly to the flange 9.

The pipe 1 terminates at the top of the inner vessel 6, and an outlet nipple 14 with shut-off cock 15 extends from the bottom of the said vessel, a pipe 16 leading from the top of the space in the vessel 6 and out through the side walls of the vessels 6 and 7 to a vacuum pump, which is not shown on the drawing. The last mentioned pipe is fitted, outside of the main tank, with a shut-off cock 17 and a back-pressure valve 18.

At the top the outer vessel 7 is fitted with a socket 19 with cut-off valve 20 for supply of steam to the cavity 8 between the vessels 6 and 7, and the outside of the cavity 11 of the lid is fitted with a socket 21 with cut-off valve 22 for supply of cooling water, the said cavity 11 being connected, by means of a jointed by-pass pipe 23, to the top part of the cavity 8 between the vessels 6 and 7. The bottom of the last mentioned cavity is finally fitted with a pipe socket 24 with cut-off cock 25 for discharge of the water of condensation or the cooling water, respectively, all depending on the said cavity having to serve as a heating jacket (when the steam valve 20 is open) or as a cooling jacket (when the water valve 22 is open). The cooling water may also, and more suitably, be directed through the apparatus in the opposite direction.

The steam socket 19, instead of leading to the cavity 8, may be continued by a steam coil inserted in the said cavity and leading independently away from the same. The cavity 8 (encircling the said steam coil) is then always maintained filled with water, which is stationary (the outlet cock 25 closed), if the cavity is to serve as a heating jacket, and the steam cock for that reason is maintained open, so that the steam coil carries steam, but is flowing, on the contrary, (the discharge cock 25 open), if the cavity is to serve as a cooling jacket, and the steam valve for that reason is maintained closed. The lid is further fitted partly with a thermometer 26 extending through the lid and so far down into the vessel that when the latter is charged with milk the thermometer will project down therein, and partly with a vacuum meter 27, which through the lid communicates with the space below the same, and finally with a pipe socket 29 fitted with a cock 28, which through the lid opens into the space below the same, and by means of an open cock gives the atmospheric air access to the interior of the vessel.

The tank A is suitably fitted with inspection holes 30 covered with glasses 31, and inside of the tank A an electric lamp 32 is suitably provided, so that it can be seen from the outside how far the boiling milk is rising.

By means of the apparatus here described the process described above is carried out in the following manner:

By means of the vacuum pump a suitable vacuum is produced in the interior of the main tank A. When then the cock 17 is closed, and the cocks 2 and 3 are opened, the milk from the storage tank B, maybe in preheated state, will be sucked through the pipe 1 and into the main tank. The sieve 4 serves here to retain any solid impurities and to prevent the milk from foaming while being supplied. When the main tank has been filled to the level indicated by the line 33, the supply is cut off, and the steam valve 20 and the discharge valve for the water of condensation are opened. During the course of some time thereafter the milk in the main tank will then have been heated to the temperature for instance 63° C., at which the low-pressure boiling is desired to commence. As soon as this temperature has been reached, the steam valve 20 is closed, and the vacuum valve 17 is opened, and the vacuum pump is started, and is then maintained in operation until such a vacuum is attained above the milk that the liquid commences to boil. The pump is then stopped, and the valve 17 is closed, after which the apparatus is left in repose for some 10 to 15 minutes. During the course of this time the temperature of the milk and of the low-pressure air above the same will gradually drop in consequence of simple loss of heat to the surroundings. At falling temperature, however, the vacuum will be increased, so that the milk, in spite of the drop in temperature will continue to boil faintly, although gradually less and less. After 10 to 15 minutes of such a low-pressure boiling, the cooling-water cock 22 is opened, the result being that the cavities 11 and 8 in the lid and between the vessels 6 and 7 will now be passed by the cooling liquid, which will cause an intense cooling of the low-pressure air over the milk, and also a certain cooling of the milk itself. Hereby a sudden increase in the vacuum above the milk will be produced, which again will result in the desired violent ebullition of the milk. The cooling will continue until normal temperature, after which the milk in this finished state is discharged by way of the pipe 14, and the process is then repeated with a fresh charge from the storage tank.

If fruit in a solution of sugar is to be treated with a view to further storage, the material—preferably in preheated state—is filled into suitable containers, such as glasses or cans, the covers are placed into position and held there temporarily by means of resilient clamping devices, after which the containers are inserted into the main tank A of the apparatus (the tank B may here be dispensed with). The low-pressure boiling is then performed as described above, it being noted that by the production of a vacuum in the tank A of the apparatus the same low pressure will also be produced in the containers for the material, as the air will be sucked out below the raisable covers of the same. During the final ebullition, the atmosphere is admitted into the tank of the apparatus and closes hermetically all the covers of the containers for the material.

Having thus described my invention, what I claim is:—

1. Process for treatment of foodstuffs, comprising cooking the foodstuffs by low-pressure boiling throughout a certain period, and finishing the period of low-pressure boiling by a vigorous ebullition.

2. Process according to claim 1 in which the low-pressure boiling is performed at decreasing temperature and with decreasing intensity in a closed vessel, which during the ebullition is barred from the evacuating apparatus.

3. Process according to claim 1 in which the vigorous ebullition of the material is effected by a sudden increase of vacuum caused by an intense cooling of the low-pressure vapor above the material.

4. The process of sterilizing foodstuffs while maintaining their original qualities and flavor substantially unimpaired, comprising heating the foodstuff to a temperature sufficiently low not to injure the foodstuff and at which boiling will take place at reduced pressure, decreasing the pressure until boiling takes place, gradually decreasing the temperature and intensity of boiling, and then greatly increasing the ebullition to cause the micro-organisms and cells in the foodstuff to come to the top of the foodstuff and burst.

5. The process of sterilizing foodstuffs while maintaining their original qualities and flavor substantially unimpaired, comprising heating the foodstuffs to a temperature sufficiently low not to injure the foodstuff and at which boiling can take place when the temperature is sufficiently reduced, cutting off the supply of heat when the said temperature is reached, gradually reducing the pressure until the desired reduced pressure is reached and boiling starts, stopping the pressure by reducing means at that point, and permitting boiling to continue as a result of the reduced pressure due to cooling of the foodstuff and the surrounding atmosphere, such boiling taking place at gradually diminishing temperature and intensity, and then greatly increasing the ebullition to cause the micro-organisms and cells in the foodstuff to come to the top of the foodstuff and burst.

6. The process of sterilizing foodstuffs while maintaining their original qualities and flavor substantially unimpaired, comprising heating the foodstuff to a temperature sufficiently low not to injure the foodstuff and at which boiling will take place at reduced pressure, decreasing the pressure until boiling takes place, gradually decreasing the temperature and intensity of boiling, and then rapidly cooling the foodstuff to greatly reduce the pressure and consequently to give rise to greatly increased ebullition to cause the micro-organisms and cells in the foodstuff to come to the top of the foodstuff and burst.

7. The process of sterilizing foodstuffs while maintaining their original qualities and flavor substantially unimpaired, comprising heating the foodstuffs to a temperature sufficiently low not to injure the foodstuff and at which boiling can take place when the temperature is sufficiently reduced, cutting off the supply of heat when the said temperature is reached, gradually reducing the pressure until the desired reduced pressure is reached and boiling starts, stopping the pressure—reducing means at that point, and permitting boiling to continue as a result of the reduced pressure due to cooling of the foodstuff and the surrounding atmosphere, such boiling taking place at gradually diminishing temperature and intensity, and then rapidly cooling the foodstuff to greatly reduce the pressure and consequently to give rise to greatly increased ebullition to cause the micro-organisms and cells in the foodstuff to come to the top of the foodstuff and burst.

8. The process of sterilizing foodstuffs while maintaining their original qualities and flavor substantially unimpaired, comprising heating the foodstuff to a temperature sufficiently low not to injure the foodstuff and at which boiling will take place at reduced pressure, decreasing the pressure until boiling takes place, gradually decreasing the temperature and intensity of boiling, and then rapidly cooling the atmosphere surrounding the foodstuff, as well as the foodstuff itself, thereby greatly reducing the pressure and thus greatly increasing the ebullition, to cause the micro-organisms and cells in the foodstuff to come to the top of the foodstuff and burst.

9. The process of sterilizing foodstuffs while maintaining their original qualities and flavor substantially unimpaired, comprising preheating the foodstuff, thereafter placing the foodstuff in a vessel, passing steam around said vessel to heat the foodstuff to a temperature sufficiently low not to injure the foodstuff but at which boiling will take place when the pressure is sufficiently reduced, stopping the flow of steam when the desired temperature is reached, connecting the vacuum pump to the space within the vessel to reduce the pressure to the point at which boiling takes place, terminating the vacuum connection when the desired reduced pressure has been reached and boiling is initiated, and permitting boiling to continue due to cooling resulting from the boiling reaction and consequent increased vacuum, said boiling taking place at diminishing temperatures and intensity, and then passing a cooling fluid about said vessel to intensely cool the contents thereof and to quickly and greatly lower the pressure to cause intense ebullition, to cause the micro-organisms and cells in the foodstuff to come to the top of the foodstuff and burst.

ERNST HEINRICH CHRISTIAN
GRAPENGETER.